(12) United States Patent
Cai et al.

(10) Patent No.: US 10,171,839 B2
(45) Date of Patent: Jan. 1, 2019

(54) GENERATING TRANSFORMS FOR COMPRESSING AND DECOMPRESSING VISUAL DATA

(71) Applicant: Massachusetts Institute of Technology, Cambridge, MA (US)

(72) Inventors: Xun Cai, Cambridge, MA (US); Jae S. Lim, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 312 days.

(21) Appl. No.: 15/079,201

(22) Filed: Mar. 24, 2016

(65) Prior Publication Data

US 2017/0280161 A1  Sep. 28, 2017

(51) Int. Cl.
*H04N 19/61* (2014.01)

(52) U.S. Cl.
CPC .................................. *H04N 19/61* (2014.11)

(58) Field of Classification Search
CPC ...................................................... H04N 19/61
USPC ..................................................... 375/240.12
See application file for complete search history.

(56) References Cited

U.S. PATENT DOCUMENTS

| | | | | |
|---|---|---|---|---|
| 2012/0307893 | A1* | 12/2012 | Reznik | G06F 17/147 375/240.12 |
| 2013/0114730 | A1* | 5/2013 | Joshi | H04N 7/30 375/240.18 |
| 2015/0264406 | A1* | 9/2015 | Kim | H04N 19/182 375/240.29 |

OTHER PUBLICATIONS

Cai et al., "Algorithms for Transform Selection in Multiple-Transform Video Compression," ICIP, 2012, pp. 2481-2484.
(Continued)

*Primary Examiner* — William C Vaughn, Jr.
*Assistant Examiner* — Jae N Noh
(74) *Attorney, Agent, or Firm* — Occhiuti & Rohlicek LLP

(57) ABSTRACT

Encoding data includes: encoding a residual of a first portion of an array of data to generate a first set of coefficients; decoding the first set of coefficients to generate a decoded representation of the first portion; computing an estimated covariance function for a residual of a second portion of the array of data based on a model that includes a gradient of a plurality of boundary data values located on a boundary of the decoded representation of the first portion; computing a set of transform basis functions from the estimated covariance function; and encoding the residual of the second portion using a first transform that uses the computed set of transform basis functions.

28 Claims, 11 Drawing Sheets

(56) References Cited

OTHER PUBLICATIONS

Cai et al., "Algorithms for Transform Selection in Multiple-Transform Video Compression," IEEE Transactions on Image Processing, vol. 22, No. 12, Dec. 2013, pp. 5395-5407.

Elyousfi et al., Fast Intra Prediction Algorithm for H.264/AVC Based on Quadratic and Gradient Model, International Journal of Electrical and Electronics Engineering, 4:1 (2010), pp. 27-35.

Lan et al., "Exploiting Non-Local Correlation via Signal-Dependent Transform (SDT)," IEEE Journal of Selected Topics in Signal Processing, vol. 5, No. 7, Nov. 2011, pp. 1298-1308.

Park et al., "Selective Intra Prediction Mode Decision for H.264/AVC Encoders," International Journal of Computer, Electrical, Automation, Control and Information Engineering, vol. 2, No. 1, 2008, pp. 171-175.

Tao et al., "Prediction of Second-Order Statistics in Motion-Compensated Video Coding," IEEE, 1998, pp. 910-914.

\* cited by examiner

GENERATING TRANSFORMS FOR COMPRESSING AND DECOMPRESSING VISUAL DATA

BACKGROUND

Compression of visual data is important because raw visual data such as images and video typically require a large number of bits for their representation. Compression allows for storage and transmission of visual data using a smaller number of bits. One aspect of compression relates to removing redundancy in the visual data, for example, by generating prediction residuals representing a difference between an original frame or block and a prediction of that original frame or block. Another aspect of compression relates to the energy compaction property associated with the processing of visual data using a transform. In transform-based coding of visual data, a transform is applied to a portion of the visual data (e.g., a block of data from a frame or prediction residual), resulting in transform coefficients. With a proper choice of the transform, a large amount of energy can be preserved with a small number of large transform coefficients. This is known as the energy compaction property of transforms. A better energy compaction allows visual data to be encoded with fewer coefficients, while preserving a certain level of image quality. Various encoding steps are also typically applied to the transform coefficients.

SUMMARY

In one aspect, in general, a method for encoding data includes: encoding a residual of a first portion of an array of data to generate a first set of coefficients; decoding the first set of coefficients to generate a decoded representation of the first portion; computing an estimated covariance function for a residual of a second portion of the array of data based on a model that includes a gradient of a plurality of boundary data values located on a boundary of the decoded representation of the first portion; computing a set of transform basis functions from the estimated covariance function; and encoding the residual of the second portion using a first transform that uses the computed set of transform basis functions.

Aspects can include one or more of the following features.

The second portion is adjacent to the first portion.

Encoding the residual of the second portion includes: generating a predicted representation of the second portion based at least in part on at least some of the plurality of boundary data values; and applying the first transform to a difference between the second portion and the predicted representation of the second portion.

Generating the predicted representation includes copying at least some of the plurality of boundary data values along a prediction direction.

The model is based on inaccuracy in the prediction direction.

The model relates statistics of intensities of the residual of the second portion to the gradient of the plurality of boundary data values and to the inaccuracy in the prediction direction.

Computing the estimated covariance function includes computing an estimated variance function at each of multiple locations of data values in the second portion, and computing the estimated covariance function based on the estimated variance function.

The gradient of the plurality of boundary data values of the decoded representation of the first portion is computed based on at least a first difference between a first pair of boundary data values.

The gradient of the plurality of boundary data values of the decoded representation of the first portion is computed based on multiple differences between respective pairs of boundary data values, including the first difference and a second difference between a second pair of boundary data values, where at least one boundary data value in the second pair is at a different location on the boundary than any data value in the first pair.

Encoding the residual of the first portion includes using a second transform different from the first transform, and decoding the first set of coefficients includes using an inverse of the second transform.

The method further includes: selecting the first transform after comparing a measure of encoding performance for the first transform with a measure of encoding performance for a second transform that does not use the computed set of transform basis functions.

The set of transform basis functions comprise Karhunen-Loève transform basis functions.

In another aspect, in general, a computer-readable medium stores a computer program for encoding data. The computer program includes instructions for causing a computer system to: encode a residual of a first portion of an array of data to generate a first set of coefficients; decode the first set of coefficients to generate a decoded representation of the first portion; compute an estimated covariance function for a residual of a second portion of the array of data based on a model that includes a gradient of a plurality of boundary data values located on a boundary of the decoded representation of the first portion; compute a set of transform basis functions from the estimated covariance function; and encode the residual of the second portion using a first transform that uses the computed set of transform basis functions.

In another aspect, in general, an apparatus for encoding data includes: transmitter circuitry configured to transmit encoded data representing portions of an array of data, and at least one processor in communication with the transmitter circuitry, configured to: encode a residual of a first portion of the array of data to generate a first set of coefficients; decode the first set of coefficients to generate a decoded representation of the first portion; compute an estimated covariance function for a residual of a second portion of the array of data based on a model that includes a gradient of a plurality of boundary data values located on a boundary of the decoded representation of the first portion; compute a set of transform basis functions from the estimated covariance function; and encode the residual of the second portion using a first transform that uses the computed set of transform basis functions.

In another aspect, in general, a method for decoding data includes: receiving data including coefficients representing portions of an array of data; decoding a first set of coefficients to generate a decoded representation of a first portion of the array of data; computing an estimated covariance function for a residual of a second portion of the array of data based on a model that includes a gradient of a plurality of boundary data values located on a boundary of the decoded representation of the first portion; computing a set of transform basis functions from the estimated covariance function; and generating a decoded representation of the second portion using an inverse of a first transform that uses the computed set of transform basis functions.

Aspects can include one or more of the following features.

The second portion is adjacent to the first portion.

Generating the decoded representation of the second portion includes: generating a predicted representation of the second portion based at least in part on at least some of the plurality of boundary data values; applying the inverse of the first transform to a second set of coefficients to generate a residual of the second portion; and computing the decoded representation of the second portion based on a sum of the predicted representation and the residual of the second portion.

Generating the predicted representation includes copying at least some of the plurality of boundary data values along a prediction direction.

The model is based on inaccuracy in the prediction direction.

The model relates statistics of intensities of the residual of the second portion to the gradient of the plurality of boundary data values and to the inaccuracy in the prediction direction.

Computing the estimated covariance function includes computing an estimated variance function at each of multiple locations of data values in the second portion, and computing the estimated covariance function based on the estimated variance function.

The gradient of the plurality of boundary data values of the decoded representation of the first portion is computed based on at least a first difference between a first pair of boundary data values.

The gradient of the plurality of boundary data values of the decoded representation of the first portion is computed based on multiple differences between respective pairs of boundary data values, including the first difference and a second difference between a second pair of boundary data values, where at least one boundary data value in the second pair is at a different location on the boundary than any data value in the first pair.

Decoding the first set of coefficients to generate the decoded representation of the first portion includes using an inverse of a second transform different from the first transform.

The method further includes: selecting the first transform based on information received from an encoder that compared a measure of encoding performance for the first transform with a measure of encoding performance for a second transform that does not use the computed set of transform basis functions.

The set of transform basis functions comprise Karhunen-Loève transform basis functions.

In another aspect, in general, a computer-readable medium stores a computer program for decoding data. The computer program includes instructions for causing a computer system to: receive data including coefficients representing portions of an array of data; decode a first set of coefficients to generate a decoded representation of a first portion of the array of data; compute an estimated covariance function for a residual of a second portion of the array of data based on a model that includes a gradient of a plurality of boundary data values located on a boundary of the decoded representation of the first portion; compute a set of transform basis functions from the estimated covariance function; and generate a decoded representation of the second portion using an inverse of a first transform that uses the computed set of transform basis functions.

In another aspect, in general, an apparatus for decoding data includes: receiver circuitry configured to receive data including coefficients representing portions of an array of data, and at least one processor in communication with the receiver circuitry, configured to: decode a first set of coefficients to generate a decoded representation of a first portion of the array of data; compute an estimated covariance function for a residual of a second portion of the array of data based on a model that includes a gradient of a plurality of boundary data values located on a boundary of the decoded representation of the first portion; compute a set of transform basis functions from the estimated covariance function; and generate a decoded representation of the second portion using an inverse of a first transform that uses the computed set of transform basis functions.

Among the many advantages of the invention (some of which may be achieved only in some of its various aspects and implementations) are the following.

For a random signal with a known covariance function, the linear transform with the best energy compaction property is the Karhunen-Loève transform (KLT). The KLT of typical images has been investigated both theoretically and empirically. It has been noted that the KLT basis functions of typical images are close to the two-dimensional discrete cosine transform (2D-DCT), so the 2D-DCT is extensively used in many image and video coding systems.

The KLT transform for a block from an image or a prediction residual is computed based on a covariance function for that block. Since the covariance function may not be known exactly, it is typically estimated. However, the estimation process may suffer from inaccuracies or may require complex and/or time-consuming computations. The techniques described herein facilitate estimation of the covariance function using a computationally efficient model that is based on typical characteristics of the block to which the transform will be applied. For example, an accurate covariance function model is described for directional intra prediction residuals.

When computing a prediction residual, a residual block is obtained by subtracting a current block from a prediction block. An intra prediction residual is one in which the prediction block is derived from information within the same frame (as opposed to information from a different frame). When computing a directional intra prediction residual, the prediction block is obtained by copying a number of pixel values on a boundary of a neighboring block along a prediction direction. For a rectangular grid, prediction directions other than horizontal or vertical may be determined approximately depending on the number of pixels in the block and the prediction direction being approximated.

In some examples, the directional intra prediction is most effective in reducing spatial redundancy for blocks containing discontinuities between portions of the image, such as step changes in image intensity, which form "edges" within the image, where the edges have clear directionality (i.e., extend along a substantially linear trajectory) within the image. In some cases, edges can be predicted fairly accurately if an accurate prediction direction is used. In practice, an accurate prediction direction may be difficult to determine. Based on the inaccuracy of prediction direction, the model described herein estimates the residual covariance as a function of the gradient of coded boundaries. A class of transforms, such as the KLT, may then be computed from the resulting estimated residual covariance, and can be used when encoding and decoding the residual block, as described in more detail below. This technique results in significant energy compaction. Experimental results have shown that with these techniques, the same amount of energy in directional intra prediction residuals can be preserved with a significantly smaller number of transform coefficients.

In addition to the transforms for intra prediction residuals, the prediction inaccuracy modeling can also be used as a robust estimation method for other transforms, and the prediction inaccuracy analysis can be useful when other prediction methods are used. For example, the techniques can be applied to transforms based on prediction inaccuracy for motion-compensated residuals, resolution-enhancement residuals, and binocular prediction residuals.

Other features and advantages of the invention will become apparent from the following description, and from the claims.

DETAILED DESCRIPTION

1 Overview

Figure 1:
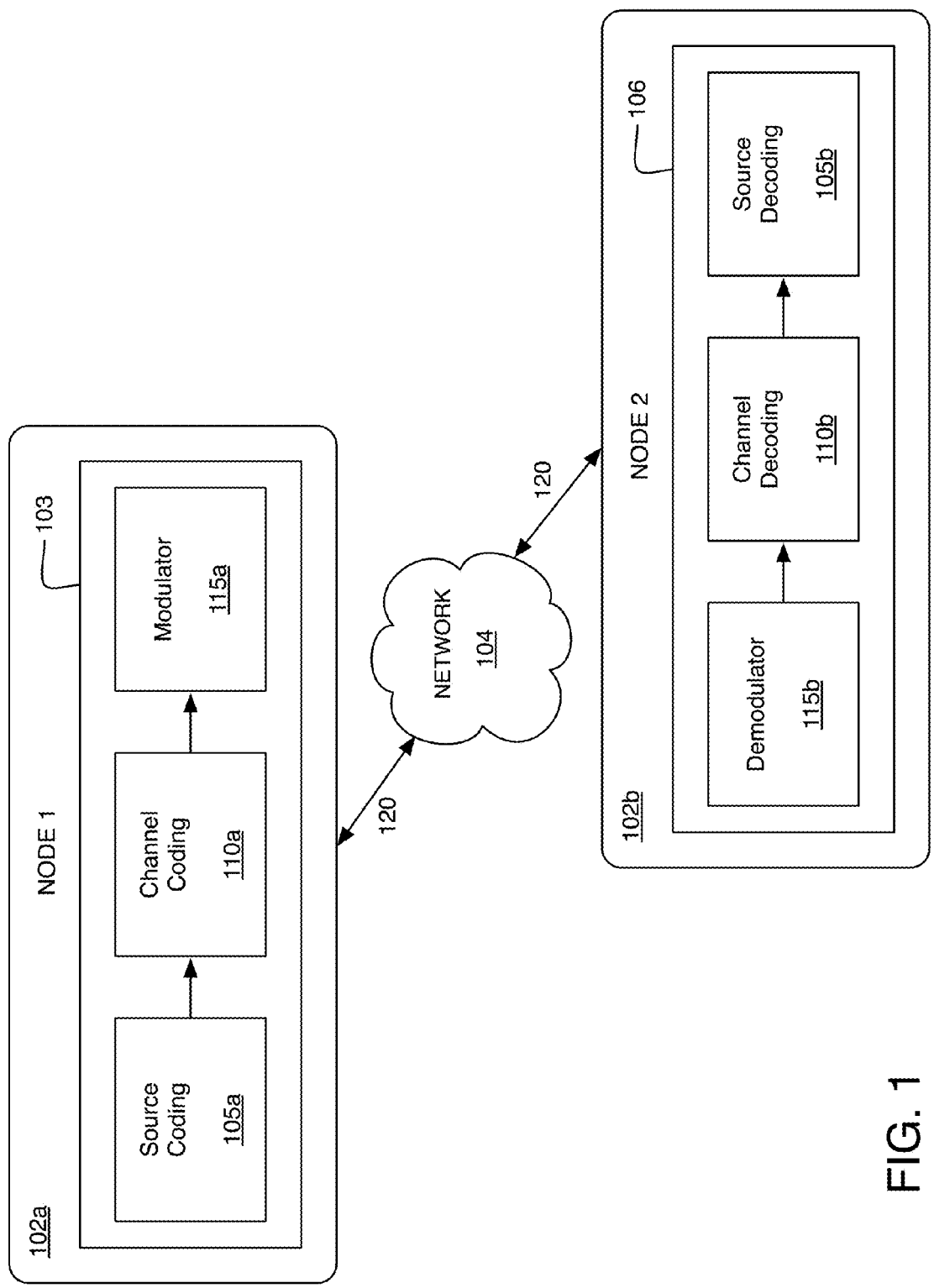
FIG. 1 is a block diagram of an exemplary communication system.

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

In image and video compression, transforms are used to reduce the spatial correlation in images and prediction residuals. Transforms can be designed using a covariance function estimated from a predetermined model (the "modeling approach") or estimated from the processing of video data (the "data-driven approach"). In the data-driven approach, the covariance is estimated by processing video data, either through an offline process before the encoding and decoding processes, or through an online (or on-the-fly) process during the encoding and decoding processes.

In the modeling approach, the signals of interest are represented with a model. The model results in a covariance function that can be used to obtain the KLT. For generating the model, typical images can be represented with a first-order auto-regressive Markov model. The KLT basis functions of such a model are close to the DCT when the pixels are highly correlated. This model is a reasonable approximation for typical image signals, particularly in a local region. This is one reason why the 2D-DCT is extensively used in many image and video coding systems. For intra prediction residuals, based on the observation that pixels in a block can be predicted more accurately when they are closer to the boundary, a first-order Markov model with the deterministic boundary can be used. One transform that can be used based on such a model is the Asymmetrical discrete sine transform (ADST). The ADST shows a significant performance improvement over the DCT for directional intra prediction residuals. As a result, it is used as an alternative to the DCT to encode intra prediction residuals in the High Efficiency Video Coding (HEVC) system.

In the offline data-driven approach, the covariance function is computed by analyzing a set of typical video sequences in an offline process. A set of signals that shares similar statistics is used to compute the empirical covariance function, and this covariance function is used to compute an empirical KLT that is used in the video coding system. Since the transform is computed offline, it does not change throughout the encoding and decoding processes. Intra prediction residuals from the same prediction mode are typically grouped to estimate the covariance function for that mode. Based on the covariance function for each mode, a set of mode-dependent transforms can be generated.

In the online data-driven approach, the covariance function is estimated during the encoding and decoding processes from encoded video data. The KLT from the estimated covariance is then obtained. The estimation process may choose to use different portions of encoded information for better adaptivity. As a result, transforms based on online covariance estimation are usually adaptive. The coded information is known to both the encoder and the decoder. In addition, the covariance estimation and the KLT computation rules are synchronized at the encoder and the decoder to adapt the transforms to the characteristics of the signals to be encoded. For example, in one approach, an adaptive transform is chosen from a predefined set of transforms. In this case, designing a reasonable set of transforms may become a difficult task. In another approach, statistics are obtained directly from coded data, but it may be difficult to ensure robust estimation based on a limited number of available samples.

Some of the techniques described herein use aspects of the modeling approach to overcome certain challenges that may be encountered with the data-driven approach, but also provides some of the advantages of the data-driven approach. A model based on the residual generation process is described that allows a more robust estimation of the covariance function from a relatively small number of coded pixels, which are available to both the encoder and the decoder. The model is also adaptive to the visual data being encoded.

FIG. 1 shows an exemplary system 100 for performing the transform-based encoding and decoding that is part of communicating visual data over a network. The system 100 includes two nodes 102a and 102b (102 in general) connected over a network 104. In this example, the node 102a transmits data to the node 102b, but in general, the nodes 102 may transmit and/or receive data to or from each other or to or from other nodes in the network 104.

In some implementations, a node 102a (node 1 in FIG. 1) includes a transmitter 103. The transmitter 103 may be configured to encode data from a source that is part of, or connected to, the node 102a, and transmit encoded data over the network 104. In some implementations, the transmitter 103 includes components for source coding 105a and channel coding 110a. The transmitter 103 may also include a modulator 115a. The transmitter may also include one or more components or devices for converting data from the source into a format suitable for source coding. In some implementations, the transmitter 103 may optionally store and retrieve encoded visual data between the source coding 105a and the channel coding 110a, and/or the node 102a may comprise multiple devices such as a device with the source coding 105a, and a separate device with the channel coding 110a and modulator 115a. Source coding 105a may also be referred to as a data compression technique. Source coding may involve encoding schemes engineered to reduce the number of bits required for representing a given image, video, or other type of information. Source coding 105a may include lossy compression techniques. In some implementations, especially when transmissions over a network are involved, lossy compression techniques are preferred since it reduces bandwidth required to transmit information. The source coding 105a can be configured to use the model-based transforms described herein. The resulting transform coefficients, representing quantities in a spatial frequency domain, are typically quantized to reduce the amount of information to be coded, which introduces some loss since the quantization cannot be perfectly reversed. The quantized transform coefficients may then be further encoded using lossless compression techniques.

A "hybrid" transform selection technique is used in some implementations, in which the model-based transform is selected from a group of multiple candidate transforms that includes other transforms such as the DCT or the ADST. In such implementations, the source coding 105a includes a selection procedure for comparing performance of different transforms on one or more decoded local reference blocks, as described in more detail below. In some implementations, source coding 105a may be in accordance with one or more standards. Such standards may include video standards such as MPEG-2, MPEG-4, H.263, H.254, and H.265 (also called High Efficiency Video Coding (HEVC)). Such standards may also include image compression standards such as JPEG.

Channel coding 110a can include the addition of redundant bits in information to be transmitted across a channel. Thus, channel coding is also considered to be lossless. Channel coding may facilitate error detection and/or error correction at a receiver end and increases the reliability of a transmission. Channel codes that add redundant bits may also be referred to as error correction codes. Channel coding 110a may include the use of codes such as block codes, convolutional codes, turbo codes and low density parity check (LDPC) codes.

The modulator 115a modulates an analog carrier in accordance with a stream of digital bits representing the encoded visual data. The modulator may use any digital modulation techniques including, for example, phase shift keying (PSK), frequency shift keying (FSK), amplitude shift keying (ASK), quadrature amplitude modulation (QAM), pulse position modulation (PPM), on-off keying (OOK), minimum shift keying (MSK), continuous phase modulation (CPM), Trellis coded modulation (TCM), and orthogonal frequency division multiplexing (OFDM).

In some implementations, a node 102b (node 2 in FIG. 1) includes a receiver 106 that is configured to receive information from another node 102 on the network. Even though FIG. 1 shows the transmitter 103 and receiver 106 to be on different nodes, it should be appreciated that any node 102 may have one or more transmitters and/or one or more receivers. Also, the transmitter 103 and/or the receiver 106 may be a part of any node 102. The receiver 106 typically includes a demodulator 115b, and components for channel decoding 110b, and source decoding 105b. The demodulator 115b typically does an inverse operation to that of the modulator 115a to recover digital bits from a received modulated analog signal. Similarly, the channel decoding 110b and source decoding 105b typically perform inverse operations to that performed by the channel coding 110a and source coding 105a, respectively. However, when lossy compression techniques are included, the source decoding 105b is generally not able to perform a perfect inverse of every operation of the source coding 105a (e.g., inverse quantization, if performed, cannot perfectly restore the original transform coefficients). As part of performing the source decoding 105b, when decoding a particular block, the node 102b uses an equivalent modeling approach for generating a model-based transform for use as an inverse transform to that used by the source coding 105a. The node 102b may also use an equivalent selection procedure to that used by the source encoding 105a for comparing performance of different transforms on one or more decoded local reference blocks when a hybrid transform is used. This avoids the need to transmit information explicitly indicating which transform was used for that particular block along with the encoded data sent over the network 104. In some implementations, the receiver 106 may be connected to a display for rendering the received video or image data. Any software and additional hardware may be used for such rendering. The receiver 106 may be connected to a storage medium to store the received digital data.

The nodes 102 may be connected via the network 104. Although FIG. 1 shows only one network 104 connecting the nodes, there may be multiple such networks interconnected with each other. The networks can be the same type of network or different types of networks. The network 104 can include a local-area network (LAN), such as a company Intranet, a metropolitan area network (MAN), or a wide area network (WAN), such as the Internet or the World Wide Web. In one implementation, the network 104 may include one or more of a private network and a public network.

The network 104 supports one or more channels between nodes connected to the network. For example the nodes 102a and 102b may be connected by a channel 120. In some implementations, the channel 120 may include different sections over different media. The channel sections may have substantially the same or different channel characteristics. In some implementations, some of the channel characteristics of the channel sections may be the same while some other channel characteristics may be different. In general, a channel may be defined as properties of at least a part of a medium over which two nodes communicate with each other.

Figure 2:
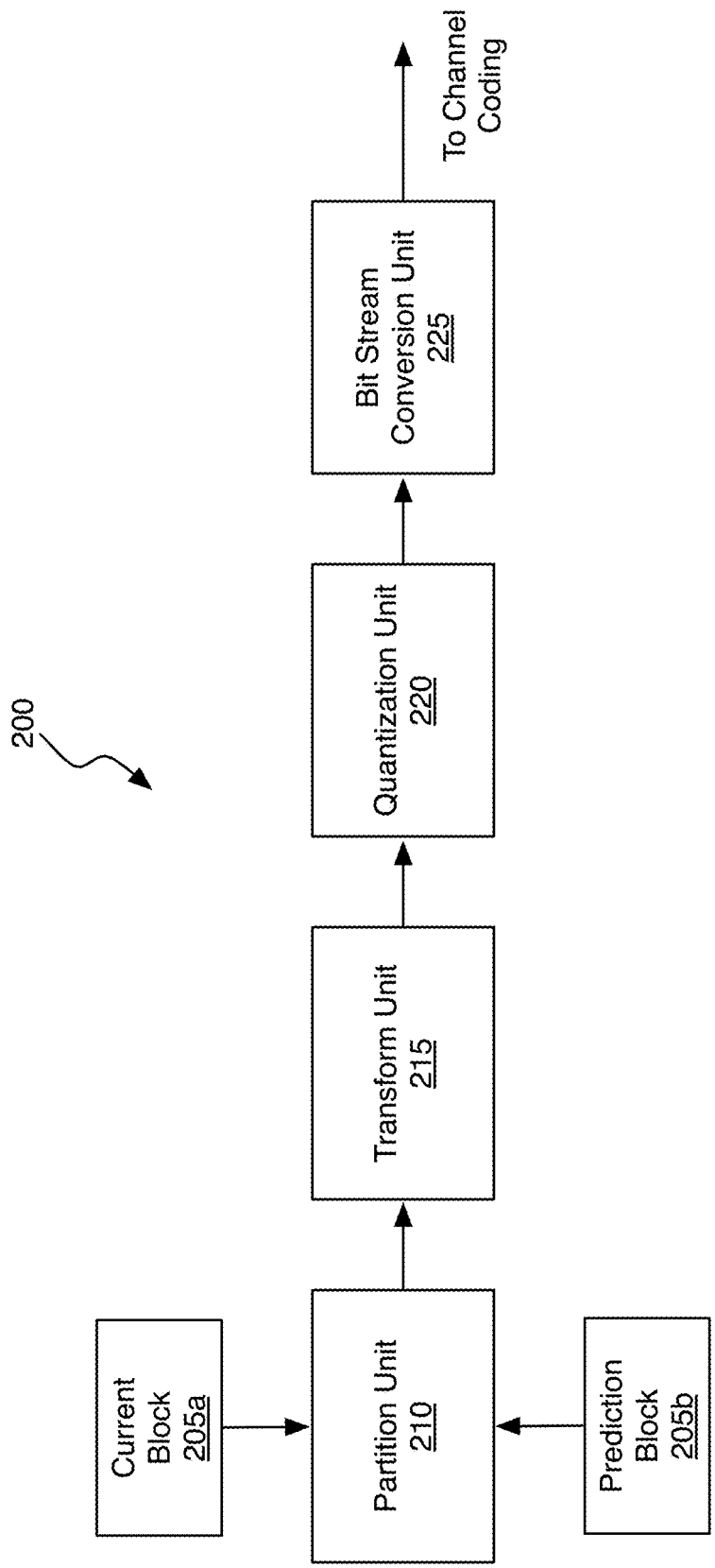
FIG. 2 is a block diagram of an exemplary source coding system.

Referring now to FIG. 2, a block diagram of an exemplary encoder 200 for implementing the source coding 105a is shown and described. The encoder 200 includes a partition unit 210 that partitions or divides a data array into multiple subparts, which are themselves arrays of data called blocks 205. In some implementations, the blocks are square arrays of pixels, where each pixel value can be encoded in any of a variety of formats. The partition unit 210 also performs any prediction being used, including intra prediction. For example, the partition unit 210 computes a difference between a current block 205*a* and a prediction block 205*b* to generate a residual block. The encoder 200 also includes a transform unit 215 that is able to generate a model-based transform, as described in more detail below, and is also able to apply that generated transform to a block such as a prediction residual to generate transform coefficients. The transform unit 215 may further include hardware or software to select or discard one or more of the computed transform coefficients. For example, the transform unit may select only non-zero coefficients of a computed transform for further processing. The encoder 200 includes a quantization unit 220 that converts transform coefficients into quantized numbers. The encoder 200 includes a bit stream conversion unit 225 that converts the quantized numbers to streams of bits using any of a variety of compression techniques (e.g., run-length coding, or entropy coding).

The partition unit 210, the transform unit 215, the quantization unit 220 and the bit stream conversion unit 225 may be implemented using any of a variety of particular hardware modules. For example any of these units may be implemented using one or more of a microprocessor, a microcontroller, and a digital signal processors (DSP). Implementations may include hardware circuits such as sample and hold circuits, adders, multipliers, shift registers, logic gates, transistors, flip flops, switches, capacitors, resistors, inductors, buses, cache memories, timing circuits and diodes. A variety of types of algorithms and/or software running on one or more programmed processors may be used in computing the transforms, quantization, partitioning or conversion to bit streams.

Figure 3:
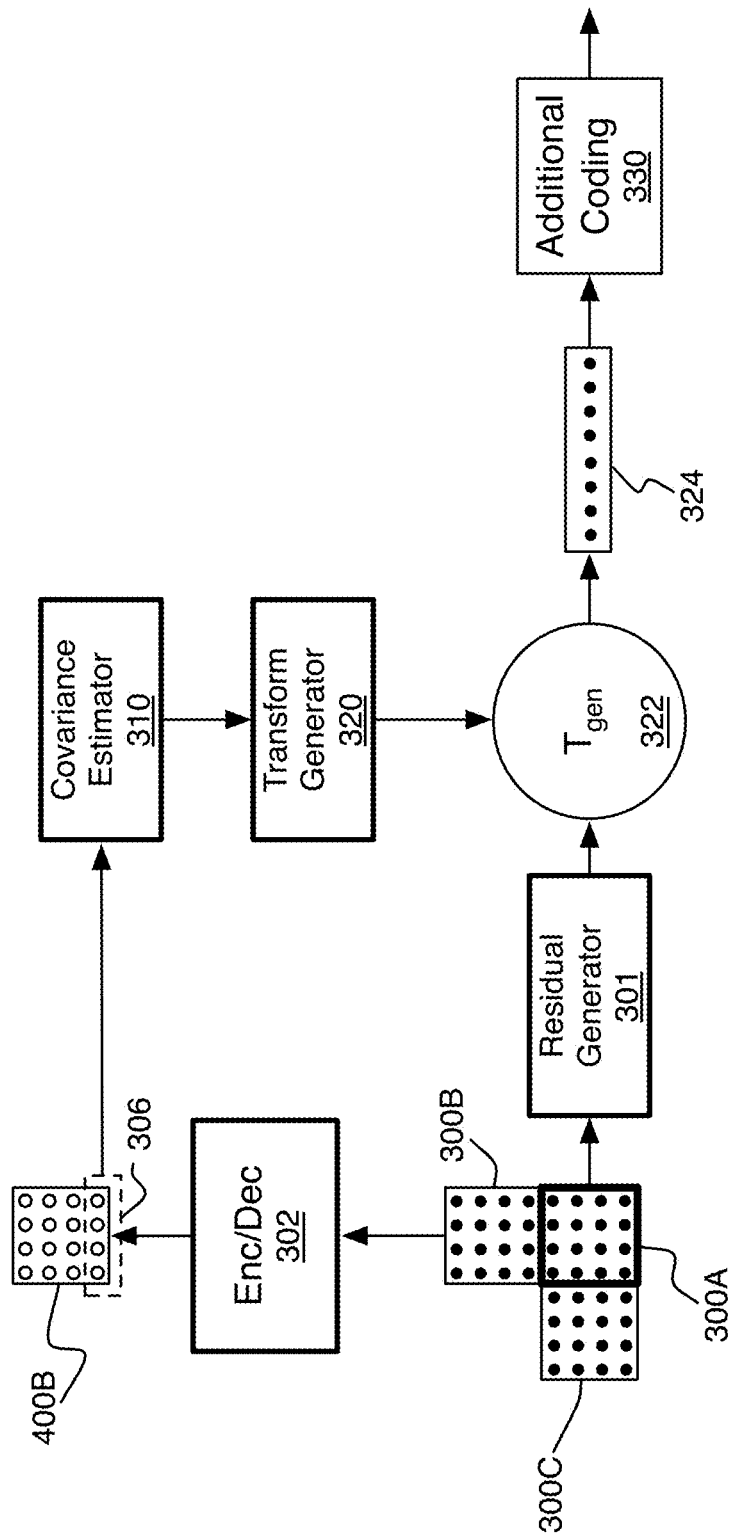
FIG. 3 is a block diagram of an exemplary encoding procedure.

FIG. 3 shows an example of a model-based transform encoding procedure that may be used by the encoder to encode the blocks of an array. A set of three neighboring blocks 300A-300C are shown for illustration purposes, but it is understood that any number of other blocks (not shown) will also exist in the entire array representing a residual being encoded. Also, each block is shown with a 4×4 array of 16 pixels, but each block may include any number of pixels (e.g., an 8×8 array of 64 pixels). In this example, it is assumed that block 300A is being encoded, and two of its neighboring blocks 300B and 300C (at the top and left, respectively) have previously been encoded. In other examples, any number of other previously encoded blocks in the array could be used, in particular blocks that are in proximity to the block 300A being encoded. As part of encoding a block, a residual generator 301 generates a predicted block that represents a prediction of that block, using only information that would also be available to the decoder, and subtracts the predicted block from that block to yield a residual block. In this example, intra prediction is assumed, where the predicted blocks are generated from other blocks within the same frame, and in particular other neighboring blocks, as described in more detail below It is the residual block that is transformed using a transform operation 322 to generate transform coefficients 324 representing that residual block. Additional coding steps 330 are also performed, such as quantization of those transform coefficients 324.

For the model-based transform encoding procedure, the encoder also performs at least some of the same decoding steps that will be performed by the decoder. One of those steps is decoding transform coefficients to generate decoded representations of any neighboring blocks being used in the encoding procedure. In this example, the neighboring block 300B undergoes such an encoding/decoding process 302 to yield the decoded representation 400B of the neighboring block 300B. The decoder will have access to the same decoded representation 400B (but, of course, not the original block 300B).

The model-based transform encoding procedure then uses that decoded representation 400B to generate the transform basis functions of the model-based transform. A covariance estimator 310 computes an estimated covariance function for the residual of block 300A. The covariance function is computed based on a model that includes a gradient of multiple boundary data values located on a boundary 306 of the decoded representation 400B. A transform generator 320 then computes a set of transform basis functions from the estimated covariance function. The transform operation 322 encodes the residual of the block 300A using the generated transform, which involves a computation using the transform basis functions computed by the transform generator 320.

This example shows the transform operation 322 applying the generated transform to the residual from the residual generator 301 to generate transform coefficients 324. In other embodiments, the transform being applied is not necessarily the generated transform, since the encoding procedure selects a transform from a group of multiple candidate transforms that includes the generated transform, using a selection procedure resulting in what is called a "hybrid transform." The selected transform can be communicated from the encoder to the decoder in side information, or an equivalent selection procedure can be performed by the decoder, which will also have access to the encoded blocks 300A-300C. The selection procedure uses a performance metric to compare estimated energy compaction performance of different types of transforms (i.e., transforms with different basis functions) and then selects one type of transform based on the comparison results. Algorithms for performing such comparisons are described, for example, in the publication X. Cai and J. Lim, "Algorithms for transform selection in multiple transform video compression" IEEE transactions on image processing, vol. 22, no. 12, p. 5395, 2013, and in the U.S. Patent Publication No. 2015/0381993 entitled "MANAGING TRANSFORMS FOR COMPRESSING AND DECOMPRESSING VISUAL DATA," each of which is incorporated herein by reference.

Figure 4:
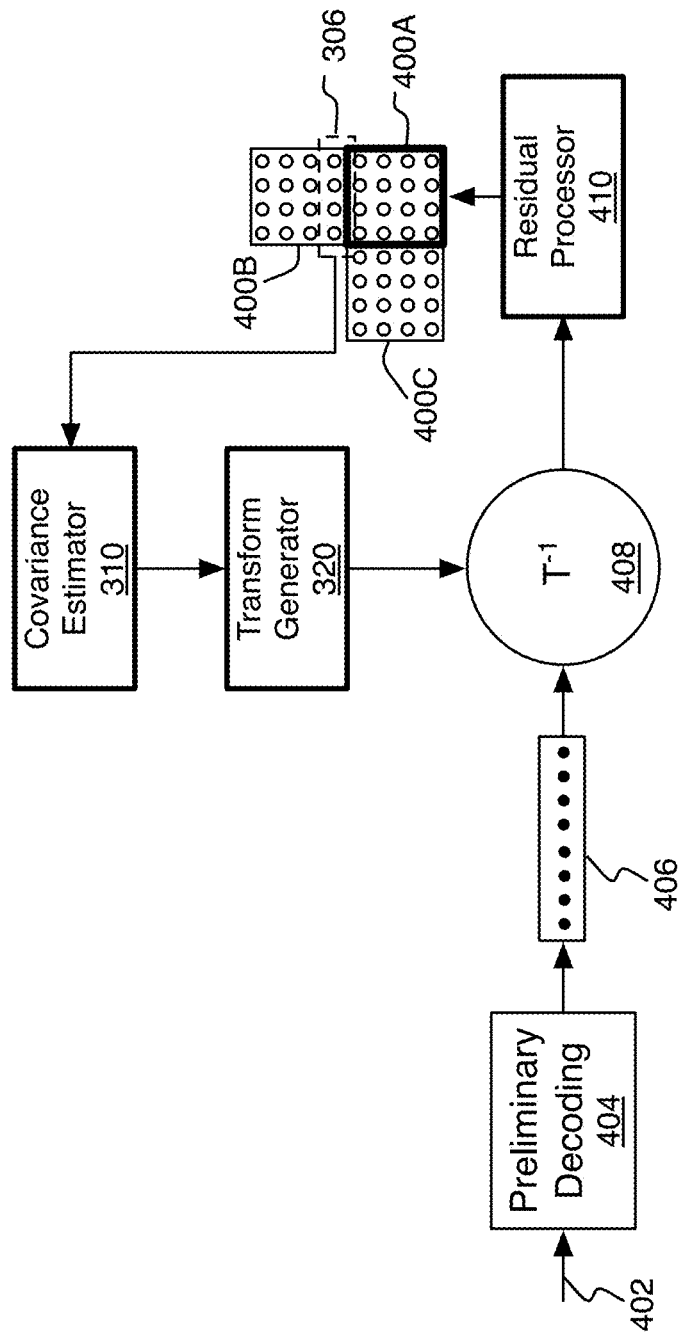
FIG. 4 is a block diagram of an exemplary decoding procedure.

FIG. 4 shows an example of a corresponding model-based transform decoding procedure that may be used by the decoder to decode the encoded blocks of an array. In this example, a set of three neighboring blocks 400A-400C are decoded representations of the three neighboring blocks 300A-300C at the encoder. Each of the blocks 400A-400C is generated by decoding an incoming bit stream 402 through preliminary decoding steps 404 to recover the transform coefficients 406. The coefficients 406 are transformed using an inverse transform operation 408 to generate a residual that is processed by a residual processor 410 to recover the decoded blocks. By the time the coefficients 324 are received for recovering the block 400A, the neighboring block 400B has already been decoded.

The model-based transform decoding procedure then uses that block 400B to generate the transform basis functions of the model-based transform in a similar manner as the encoder. The covariance estimator 310 computes an estimated covariance function for the residual of block 400A. The covariance function is computed based on a model that includes a gradient of multiple boundary data values located on the same boundary 306 of the decoded representation 400B as was used by the encoder. The transform generator 320 then computes a set of transform basis functions from the estimated covariance function. The inverse transform operation 408 is applied to the coefficients 324 to yield a residual of the block 400A using the generated transform, which involves a computation using the transform basis functions computed by the transform generator 320. The residual processor 410 recovers the decoded block 400A from that residual.

2 Example Adaptive Transform

In this section, we describe examples of procedures for generating transforms for directional intra prediction residuals. First, we discuss the characteristics of directional intra prediction residuals based on empirical observations in Section 2.1. In Section 2.2, we describe an example model that characterizes these empirical observations. Specifically, we model the directional intra prediction as the result of prediction inaccuracy. From this example model, we can estimate the residual covariance based on the gradient of the coded/decoded boundary. The example model is first discussed in the horizontal prediction and extended to arbitrary directions. The statistics of the example procedure are analyzed in Section 2.3. An example of a generated transform (in the form of basis functions for a KLT) derived from the covariance function is described in Section 2.4. Finally, we discuss the gradient computation on a discrete sampling grid in Section 2.5.

2.1 Characteristics of Directional Intra Prediction Residuals

Figure 5:
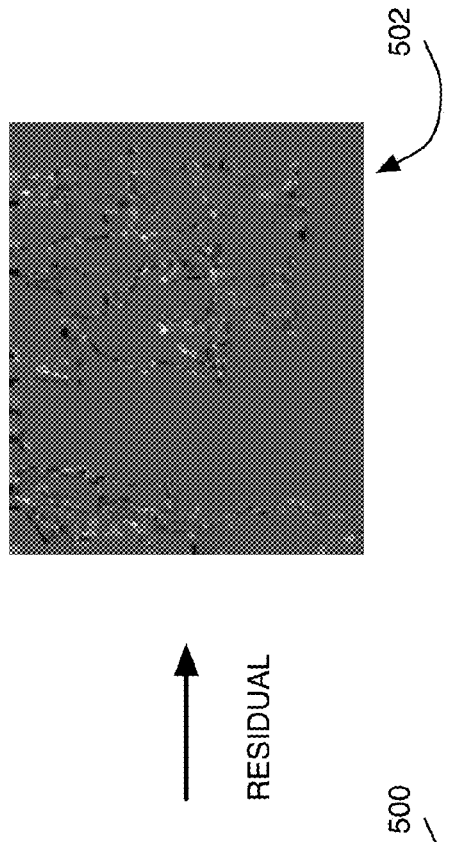
FIG. 5 is a pair of images showing an example still frame and its prediction residual.

The characteristics of intra prediction residuals are significantly different from those of still images. FIG. 5 shows an example of a still frame 500 and its intra prediction residual frame 502. (The residual frame 502 is shown with an offset of 128, to show the negative values.) In this example, and for a typical still image, we observe that image intensities tend to be stationary in most smooth regions of the image. For typical intra prediction residuals, we observe that most regions are close to zero, as a consequence of the effective intra prediction in smooth regions. In the regions where sharp edges and busy textures arise, the intra prediction becomes less effective, and the residuals become much larger in these regions.

Figure 6:
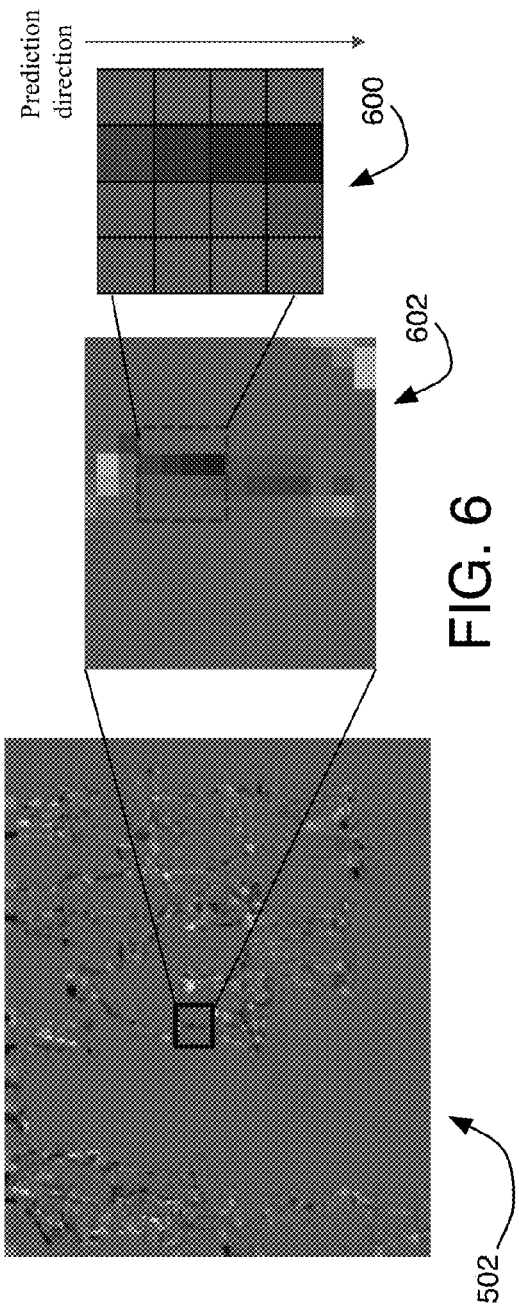
FIG. 6 is a set of images showing a block within a portion of a residual.

To examine the characteristics of directional intra prediction residuals on a block-by-block basis, FIG. 6 shows a 4×4 block 600 within a portion 602 of the intra prediction residual frame 502. For this 4×4 block 600, vertical prediction is used. Generally, intensities of directional prediction residuals tend to increase along the prediction direction, as the distance from the boundary of the block increases. This observation is typical in many video sequences. In addition, the residual signal along the direction orthogonal to the prediction direction generally displays significantly different characteristics. Specifically, the residual intensities change abruptly along the direction orthogonal to the prediction direction, as shown in FIG. 6. This observation indicates that the residual signal may be highly non-stationary in the direction orthogonal to the prediction direction. The characteristics of the prediction residuals are very sensitive, not only to the prediction direction, but to the local change of the image data as well. In other words, the characteristics of the prediction residuals should not only be mode-dependent, but also data-dependent.

The non-stationarity of residual signals can be an indication of the prediction accuracy (or inaccuracy). In those regions where there are sharp discontinuities in the original frame, the prediction tends to be less accurate. Therefore, the residual intensities in such regions tend to be large relative to smooth regions. This observation can be used to predict the statistics of the residuals, in particular when the procedures can relate the local change of image data to coded/decoded data. In some implementations, the model enables the procedures to estimate the statistics of the residual signal only from a region that has already been encoded (i.e., from coded/decoded data).

To configure the model to estimate the residual statistics only from the coded/decoded data, we consider the process of directional intra prediction. Specifically, we consider the sensitivity of prediction to the accuracy of the prediction direction. In a smooth region where pixels share similar intensities, the prediction accuracy is less sensitive to the prediction direction. On the other hand, in the regions where sharp discontinuities exist in the original frame, the prediction is very sensitive to the accuracy of the prediction direction. A small disturbance of the prediction direction away from the actual direction may lead to a large prediction error. This observation leads to a model that estimates the residual covariance only from the coded/decoded boundary. In the following subsections, we describe an example of such a model in detail.

2.2 Prediction Inaccuracy Modeling

In this section, we describe example models for directional intra prediction residuals. Specifically, we relate the residual intensities to the prediction inaccuracy and boundary gradient. We first derive a simplified model for horizontal (or vertical) prediction to illustrate the idea. We then extend the simplified model to arbitrary prediction directions for a more general example model that uses any neighboring blocks that are one of the four adjacent blocks surrounding any given block.

We first establish the notation for the example models, which will be used by the encoding and decoding procedures. We consider a rectangular block to be encoded, and we use the following notation:

f(m, n): current block to be encoded where n and m each vary from 1 to a maximum value that depends on the size (and shape) of the block.

$\hat{f}$(m, n): predicted block, obtained by copying the coded/decoded left boundary f (0, n) along the horizontal direction.

r(m, n): residual block, obtained by subtracting $\hat{f}$(m, n), the predicted block, from f(m, n), the current block.

Figure 7:
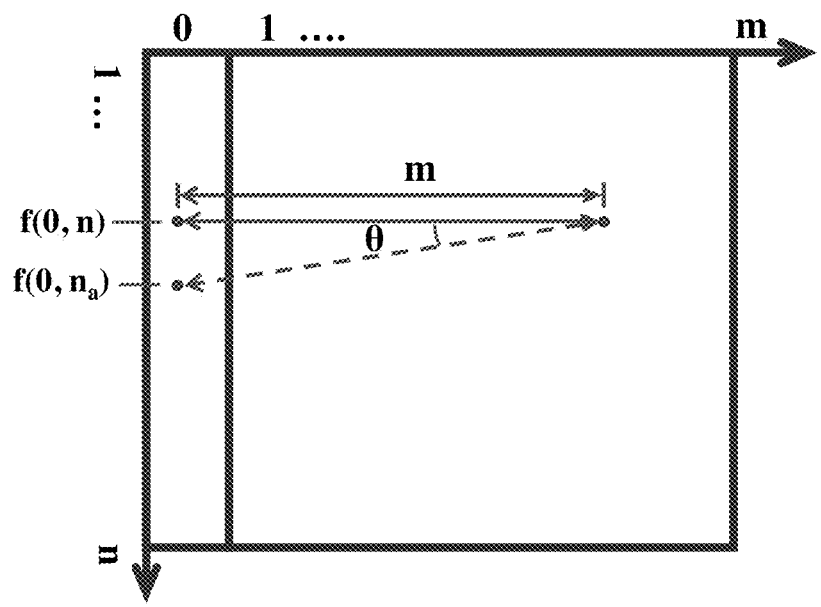
FIG. 7 is a diagram showing a current block and neighboring boundary.

In the above notation, m is the horizontal coordinate, m=0 corresponds to the coded/decoded left boundary that is used for prediction, n corresponds to the vertical coordinate and m, n≥1 is the area to be encoded. The current block and the "left boundary," which is the right boundary of the adjacent left block, are illustrated in FIG. 7.

The residual is obtained by subtracting the prediction from the current block:

$$r(m,n)=f(m,n)-\hat{f}(m,n) \quad (1)$$

The prediction is obtained by horizontal prediction:

$$\hat{f}(m,n)=f(0,n) \quad (2)$$

In addition, we assume that the accurate prediction direction is characterized by a random variable θ(m, n) taking small values. This θ can be assumed, for example, to be uniformly distributed in all directions over some range of directions that are near the horizontal direction. Suppose we denote $n_a$ as the location along the coded/decoded boundary of the pixel value that would yield the most accurate prediction. Ignoring the difference between the intensities of the current pixel and the perfect prediction, we obtain:

$$f(m,n) \approx f(0,n_a) \quad (3)$$

where $$n_a = n + m \tan(\theta(m,n)) \approx n + m\theta(m,n) \quad (4)$$

for small $\theta$. This can be seen from the geometry shown in FIG. 7.

From equations (1), (2), (3) and (4), we obtain:

$$r(m, n) = f(m, n) - \hat{f}(m, n) \approx \qquad (5)$$
$$f(0, n_a) - f(0, n) \approx (n_a - n)\frac{\partial f(0, n)}{\partial n} \approx m\theta(m, n)\frac{\partial f(0, n)}{\partial n}$$

for small $\theta$ and therefore small $n_a$−n.

Equation (5) indicates that the residual intensity is proportional to the distance m and to the boundary gradient. In addition, the residual intensity depends on how inaccurate the prediction direction is away from the actual direction, characterized by a random variable $\theta$.

Figure 8:
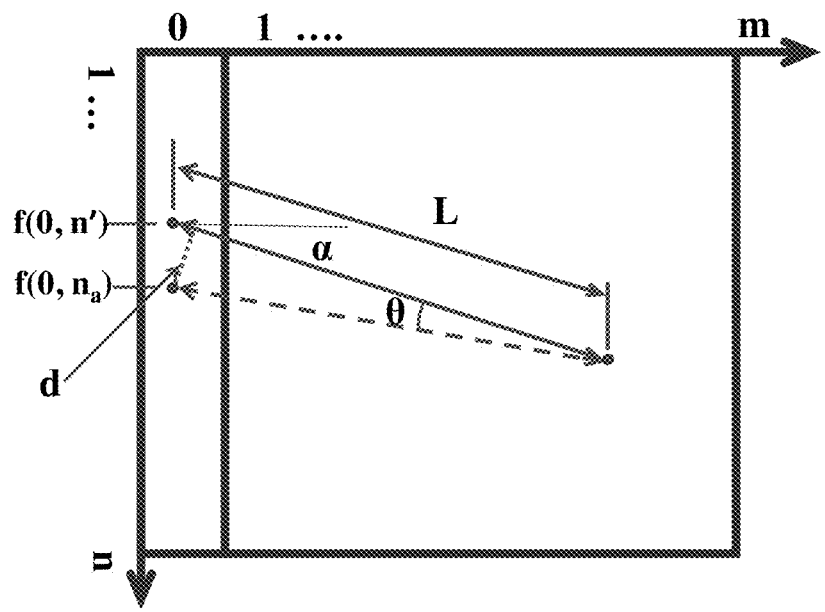
FIG. 8 is a diagram showing a current block and neighboring boundary.

For an arbitrary prediction direction, the model derivation is similar to that above for the horizontal prediction direction. This example model is configured to provide an estimated residual signal as a function of a boundary gradient and a prediction inaccuracy. FIG. 8 shows the geometry for the derivation of the model. We first illustrate a case in which pixels in the left boundary are used as predictors. An upper boundary case can then be derived by symmetry. We note that in general, pixels in both the upper boundary and the left boundary can be used as predictors for one block. Therefore, both cases are used to derive the model for one block in the general case.

When an arbitrary prediction direction is used, the current pixel is predicted from a pixel with a different boundary coordinate. Therefore, n is replaced by n'. In addition, the displacement from the accurate predictor to the predictor used is related to $\theta$ in a different way. Consider the geometry shown in FIG. 8. The arc length resulting from the inaccurate prediction direction is d≈L$\theta$. In this relation, L is the distance from the residual pixel to its boundary predictor. From the geometry shown in FIG. 8, the displacement becomes $$n_a - n \approx \frac{d}{\cos\alpha},$$

where $\alpha$ is the angle between the prediction direction and the line perpendicular to the boundary.

Combining these results, we obtain the following estimation by analogy to the horizontal case:

$$r(m, n) \approx \frac{L}{\cos\alpha} \frac{\partial f(0, n)}{\partial n}\bigg|_{n'} \theta(m, n) \quad (6)$$

Equation (6) indicates that the residual is proportional to the boundary gradient, evaluated at the position of the predictor. In addition, the residual is proportional to the distance from the current pixel to its boundary predictor scaled by a factor related with the prediction direction. We note that the general case is consistent with the horizontal case. When the horizontal prediction is used, $\alpha=0$, L=m and Equation (6) reduces to Equation (5). As another example, when diagonal prediction is used, $$\alpha = \frac{\pi}{4}.$$

Equation (6) will be used to derive the covariance function for the residual signal in Section 2.3.

2.3 Statistics Based on Prediction Inaccuracy

From Equation (6), the randomness of residual signal in the example model originates from the randomness of the prediction inaccuracy $\theta$. This observation implies that we can determine the statistics of the residual signal by determining that of prediction inaccuracy. In this section, we determine the mean, variance and covariance of the process, characterized by the example model.

2.3.1 Mean

We first note that $E[\theta(m, n)]=0$. This is reasonable since the prediction direction inaccuracy would not generally be biased towards any side. This leads to:

$$E[r(m, n)] = \frac{L}{\cos\alpha} \frac{\partial f(0, n)}{\partial n}\bigg|_{n'} E[\theta(m, n)] = 0 \quad (7)$$

2.3.2 Variance

Denote the variance function as $\sigma^2(m, n)$. We take the expectation of $r^2$, with respect to the random variable $\theta$.

$$\sigma^2(m, n) = E[r^2(m, n)] \approx \left[\frac{L}{\cos\alpha}\right]^2 \left[\frac{\partial f(0, n)}{\partial n}\right]^2\bigg|_{n'} E[\theta(m, n)^2] \quad (8)$$

This relationship indicates that the residual variance is proportional to the squared distance and squared boundary gradient. In other words, residual intensity tends to be large where the boundary gradient at the predictor is large. In this example model, the boundary gradient is an estimation of the amount of local change along the prediction direction. Therefore, this relationship also indicates that the residual is large when the estimated local change at the same location is large. This is consistent with the description in Section 2.1.

2.3.3 Covariance

Since the random process is zero-mean, Equation (6) and Equation (8) directly lead to the following covariance function:

$$\mathrm{Cov}[r(m_1,n_1)r(m_2,n_2)] = \sigma(m_1,n_1)\sigma(m_2,n_2)R \quad (9)$$

where R is the factor that characterizes the correlation of the prediction inaccuracy, defined as $$R = \frac{E[\theta(m_1, n_1)\theta(m_2, n_2)]}{\sqrt{E[\theta^2(m_1, n_1)]E[\theta^2(m_2, n_2)]}} \quad (10)$$

The relationship in Equation (9) indicates that the covariance function of the residual signal depends on the estimated residual standard deviation a and the statistics of the prediction inaccuracy R. Specifically, this equation indicates that the non-stationarity of the residuals is reflected mostly by a drastic change of the residual variance function. By choosing a reasonable R, we can obtain a reasonable residual covariance function.

Since most non-stationarity in the residual covariance function is reflected in a drastic change of the variance function, the prediction inaccuracy is relatively stationary.

Therefore, we relate the prediction inaccuracy to the first-order Markov process. In particular, the example model can use the following relationship:

$$E[\theta(m_1,n_1)\theta(m_2,n_2)]=\eta_1^{|m1-m2|}\rho_2^{|n1-n2|} \quad (11)$$

With the choice of the function in Equation (11), we can see that when $m_1=m_2$ and $n_1=n_2$, $$E[\theta^2(m_1,n_1)]=E[\theta^2(m_2,n_2)]=1 \quad (12)$$

With Equations (10), (11) and (12), $$R=\rho_1^{|m1-m2|}\rho_2^{|n1-n2|} \quad (13)$$

Therefore, the residual covariance function is:

$$Cov[r(m_1,n_1)r(m_2,n_2)]=\sigma(m_1,n_1)\sigma(m_2,n_2)$$
$$\rho_1^{|m1-m2|}\rho_2^{|n1-n2|} \quad (14)$$

2.4 Transforms Based on the Determined Covariance Function

From the covariance function in Equation (14), the procedures are able to compute KLT basis functions. The KLT is used to encode the current residual block. In general, it may be very difficult to obtain a closed-form solution of the transform basis functions based on the determined covariance function. To study the characteristics of the transform basis functions, we consider two examples.

We first consider a simplified 1-D example. Suppose that a zero-mean signal is denoted as x(n), where $0 \leq n \leq 3$. The variance of this signal is given by $\sigma^2(0)=\sigma^2(1)=0$ and $\sigma^2(2)=\sigma^2(3)=1$. A typical transform that ignores the variance information, such as the DCT, will in general result in transform coefficients of length 4. However, if the given variance information is considered, we can see that x(0) and x(1) are almost surely to be zero. Therefore, the covariance function proposed in Equation (14) will result in a transform with the first two basis functions supported only on x(2) and x(3). This leads to significant transform coefficients of length at most 2. In other words, by considering the variance information, we are effectively adapting the transform to the non-stationarity of the signal. Therefore, the resulting transform tends to achieve much better energy compaction in this example.

Figure 9:
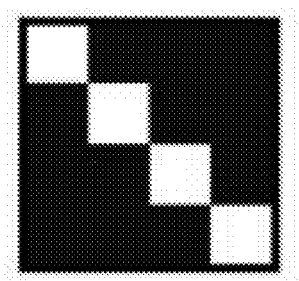
FIG. 9 is a diagram showing a variance block.
Figure 10:
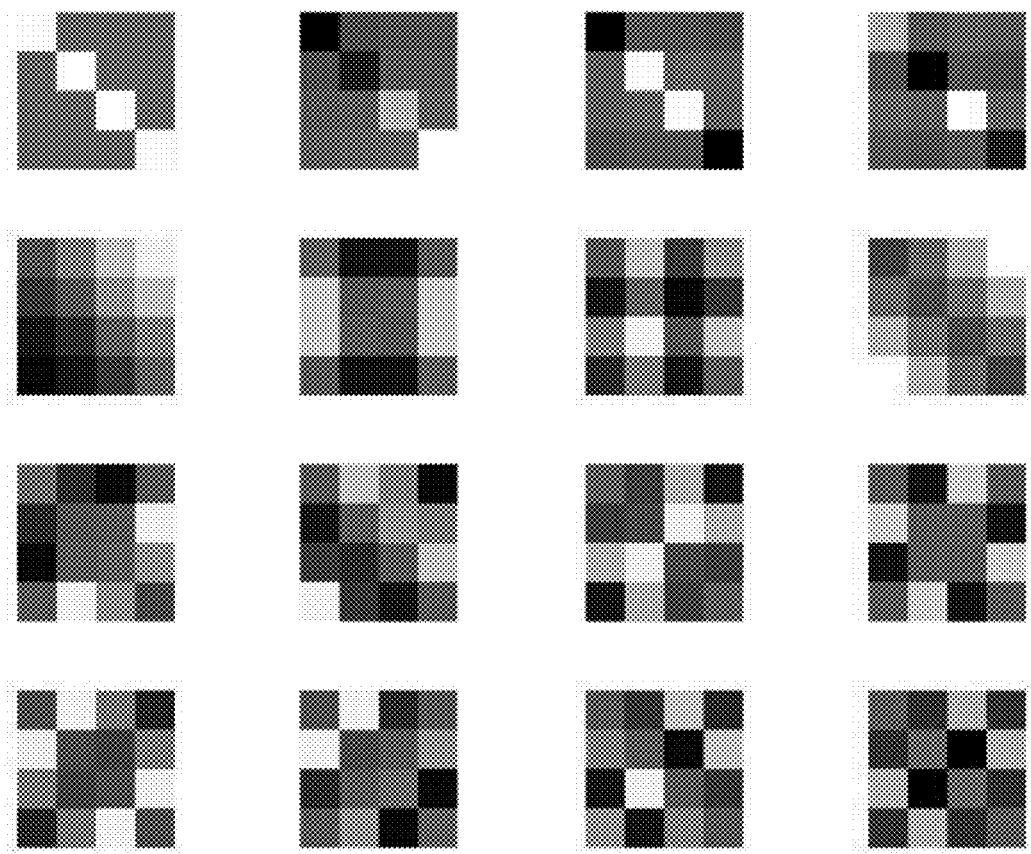
FIG. 10 is a diagram showing transform basis functions derived from the variance block.

As another example, we consider the example variance block and resulting transform basis functions shown in FIG. 9 and FIG. 10, respectively. (The transform basis functions are shown with an offset 0.5 to illustrate negative values.) In this example, we show the variance function in a 4×4 block in FIG. 9. The variance of the brighter pixels is 0.9 while the variance of the darker pixels is 0.1. This variance function is used to construct a covariance function in Equation (14), with $\rho_1=\rho_2=0.99$. In FIG. 10, we show the KLT basis functions from this covariance function. From this figure, we observe that the region of support for the first several basis functions is mostly within the region where the variance (in FIG. 9) is large. This observation indicates that the generated transform is adapted well to the non-stationarity of the signal. Specifically, the generated transform first considers encoding the pixels with large intensities and compresses most of their energy into a small number of transform coefficients.

Finally, we note that the covariance function is estimated only from the coded/decoded boundary pixels. Therefore, the same covariance function can be estimated both at the encoder and the decoder. The procedures are not required to transmit any side information associated with the transform coefficients.

To summarize, the example procedure includes the following steps:

Step A: For each pixel in the current block, estimate the variance function according to Equation (8).

Step B: Using the variance function in Step A, construct the covariance function according to Equation (14).

Step C: Compute the KLT of the covariance function in Step B. Use this KLT to encode the current block.

2.5 Gradient Computation on a Discrete Grid

In the example procedure, we derive the residual covariance as a function of the boundary gradient. In an ideal situation, the boundary gradient at any given location can be computed, if coded/decoded boundary samples are dense enough. In practice, the density of available samples is limited by the density of the sampling grid. This limitation requires the boundary gradient to be estimated from a small number of boundary pixels. In this section, we discuss the gradient computation on a discrete sampling grid.

Consider estimating the variance function in Equation (8). In this equation, the boundary gradient is evaluated at location n'. The value of n' can be computed from the location of the current pixel and the given prediction direction. The geometry is shown in FIG. 8. (The case in which the left boundary is used is illustrated, but the upper boundary case is can be derived from the left boundary case by symmetry.) While the coordinates of the current pixel are integers, n' may not necessarily be an integer. To compute the gradient for different possible values of n', we consider the following three typical cases.

2.5.1 n' is a Positive Integer

Figure 11:
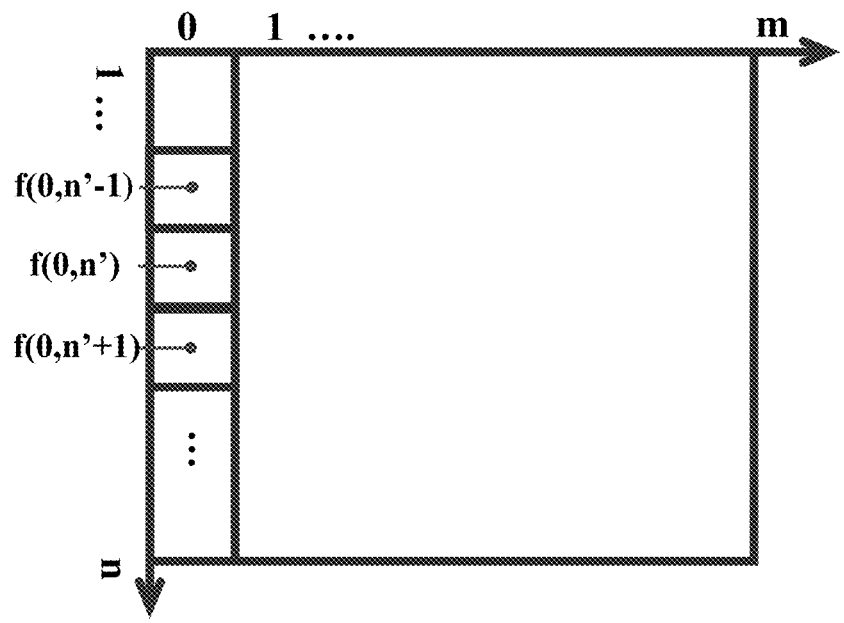
FIG. 11 is a diagram illustrating gradient computation for a positive integer n'.

A positive integer n' implies that the procedures evaluate the gradient on the sampling grid. In this case, the procedures estimate the gradient from three reference samples. Suppose the procedures predict from the left boundary, corresponding to the block shown in FIG. 11. To evaluate the gradient at location (0, n'), the procedures can estimate the gradient as either f (0, n')–f(0, n'–1) or f(0, n'+1)–f(0, n'). From the example model, the prediction inaccuracy is not biased towards the positive or the negative side of n'. Therefore, the contribution of two estimations is likely to be equal. Since the variance is proportional to the square of the gradient, the procedures can estimate the square of the gradient effectively as the mean square of two estimations. In other words, when n' is a positive integer:

$$\left[\frac{\partial f(0,n)}{\partial n}\right]^2\bigg|_{n'} = \quad (15)$$
$$\frac{1}{2}[f(0,n')-f(0,n'-1)]^2 + \frac{1}{2}[f(0,n'+1)-f(0,n')]^2$$

2.5.2 n' is Not a Integer

Figure 12:
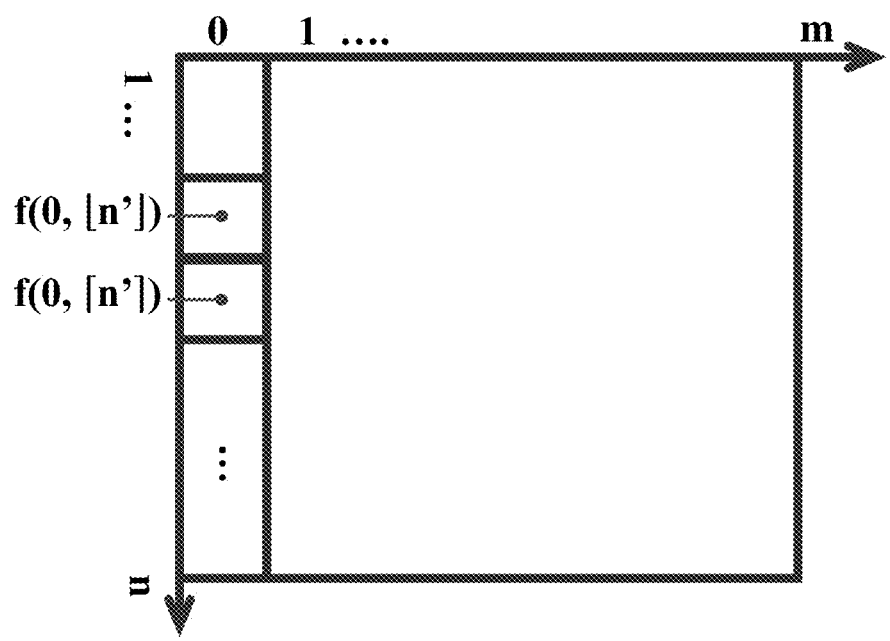
FIG. 12 is a diagram illustrating gradient computation for a non-integer n'.

When n' is not an integer, the procedures evaluate the gradient in between two boundary pixels f(0, ⌈n'⌉) and f(0, ⌊n'⌋). This is illustrated in FIG. 12. In this case, the squared gradient is simply given by:

$$\left[\frac{\partial f(0,n)}{\partial n}\right]^2\bigg|_{n'} = [f(0,\lceil n'\rceil)-f(0,\lfloor n'\rfloor)]_2 \quad (16)$$

2.5.3 n' is Zero (The Corner Predictor is Used)

Figure 13:
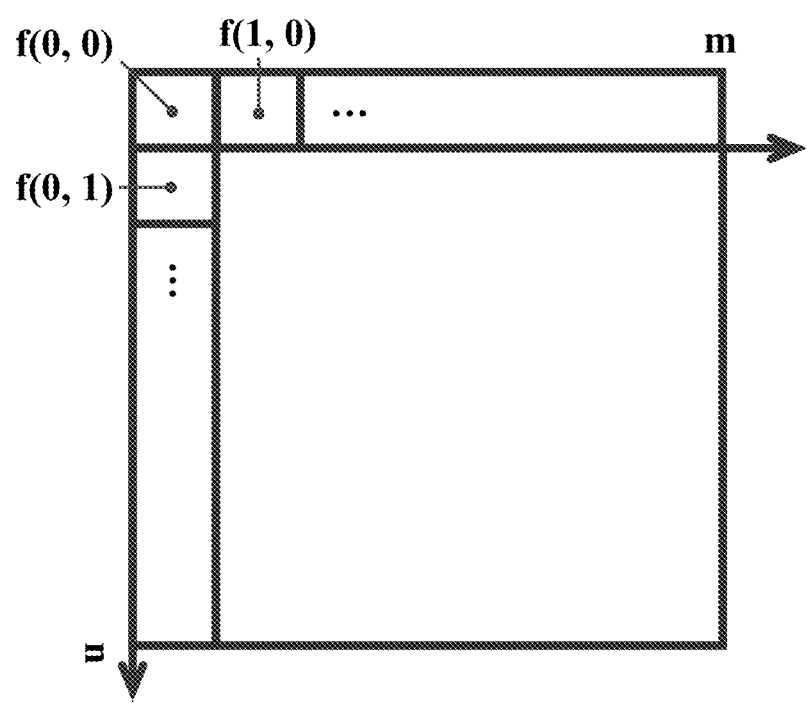
FIG. 13 is a diagram illustrating gradient computation for a zero-valued n'.

In the case when non horizontal/vertical prediction is chosen, the upper left corner predictor is used when n'=0. This is shown in FIG. 13. In this case, the gradient can be estimated as f(1, 0)–f(0, 0) when the accurate prediction is from the upper boundary. On the other hand, the gradient can be estimated as f(0,1)−f(0, 0) when the accurate prediction comes from the left boundary. Both cases are equally likely to happen. As in the case when n' is a non-zero integer, the procedures estimate the gradient by averaging two cases.

In Equation (8), the variance is scaled by a factor related to the prediction angle α. The prediction angle is fixed when only one boundary is used. In the case when n'=0, both the upper boundary and the left boundary are involved in the gradient computation. The prediction angle is different for the upper boundary and for the left boundary. Therefore, the procedures are able to directly estimate the variance in this case. The variance is estimated as:

$$\sigma^2(m, n) = \frac{1}{2}\left[\frac{L}{\cos\alpha_U}\right]^2 f(1, 0) - f(0, 0)^2 + \frac{1}{2}\left[\frac{L}{\cos\alpha_L}\right]^2 f(0, 1) - f(0, 0)^2 \quad (17)$$

where $\alpha_U$ is the prediction angle from the upper boundary and $\alpha_L$ is the prediction angle from the left boundary.

3 Performance

In this section, we investigate the performance of the example procedures for a typical configuration of an "example system" described in Section 3.1. We then show that the example procedures can effectively estimate the residual statistics that reflect the characteristics of the residual signals in Section 3.2. The energy compaction performance of the example system is then discussed.

3.1 Example System

The example system is configured to obtain the directional intra prediction residuals according to certain aspects of the prediction procedures used by the H.264 standard. The block size is fixed to 4×4 and all prediction modes are used. Original samples are used to construct the directional intra predictors and estimate the covariance function. The effect of quantized boundary predictors used in practice will be discussed in Section 3.4. For the generated transform, the example procedures estimate the covariance function as discussed in Section 2. The parameter p is chosen to be 0.99. (We note that in the example system, changing p within a reasonable range does not significantly affect the results.) In the covariance estimation process, the coded/decoded boundary gradient may become zero in boundary and smooth regions. For these cases, the example system is configured to use the DCT or ADST basis functions instead of the generated KLT basis functions (i.e., the "generated transform").

The energy compaction property of the generated transform is investigated. Specifically, the example system is configured to use the generated transform "in hybrid" with the DCT or the ADST, where the generated transform is only used if it is expected to perform more efficiently than either the DCT or the ADST in a transform selection procedure that is performed by the encoder, with the result of the selection transmitted to the decoder within 1-bit of side information. Alternatively, an equivalent selection procedure can be performed at the decoder, using information available to the decoder. We compare the energy compaction of this "hybrid transform" to the DCT alone and to the ADST alone. We compute the preserved energy given the total number of chosen coefficients. Transform coefficients with largest magnitudes within a frame are chosen. In the case of the hybrid transform, the transforms and transform coefficients are selected, for each block, utilizing the algorithms mentioned above. We plot the preserved energy as a function of the total number of chosen coefficients. The preserved energy is in terms of the percentage relative to the total energy. The total number of chosen coefficients is presented in terms of the percentage relative to the total number of coefficients. A larger preserved energy value at the same percentage of chosen coefficients indicates a higher performance in energy preservation. The energy compaction capability is a useful measure of performance in coding applications.

3.2 Variance Estimation

In the example procedure, the non-stationarity of residual signals is reflected by the local change of the estimated variance function. An accurate estimation of the residual variance would result in more compact transform coefficients. The ideal estimated variance function should take large values precisely where the residual is large. On the other hand, transforms that do not consider the non-stationarity of residual signals, such as the DCT, implicitly assume a uniform variance function. The performance of the transform heavily depends on the consistency between the estimated variance function and the residual signal.

Figure 14:
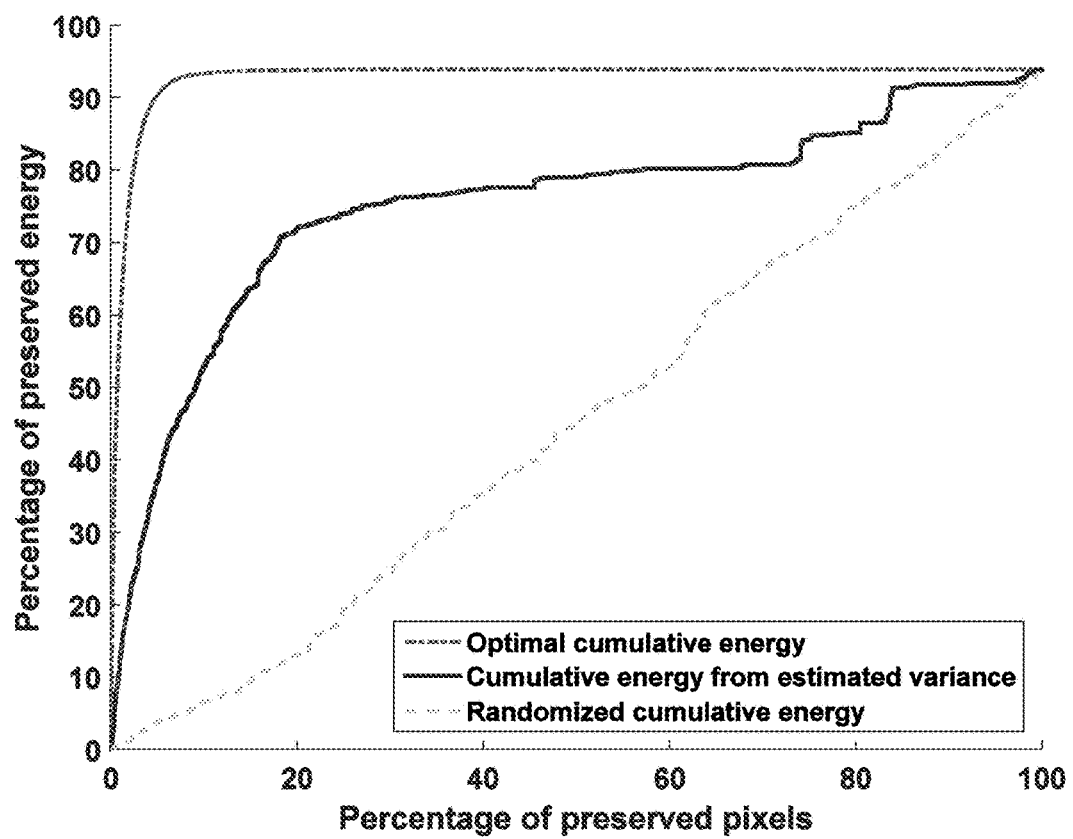
FIG. 14 is a set of plots of cumulative energy functions.

To quantify the consistency between the magnitude of the residual signal and the estimated variance function, we study the cumulative energy of the residual signal. In FIG. 14, we show three cumulative energy curves. In the optimal cumulative energy, we rank order the residual magnitude and compute the cumulative energy from the largest residual pixels. In the cumulative energy from the estimated variance, we rank order the estimated variance and compute the cumulative energy from pixels with the largest estimated variance. In the randomized cumulative energy, we compute the cumulative energy from a randomly chosen set of pixels. The cumulative energy indicates how informative the estimated variance is in preserving the residual energy.

In the ideal case, suppose the estimated variance is very accurate and precisely reflects the rank order information of the residual magnitude. If we choose the residual pixels from the largest estimated variance, the preserved energy as a function of the number of preserved pixels is the largest. It is represented by the optimal cumulative energy. On the other hand, suppose the estimated variance is not related to the residual magnitude. In this case, the cumulative energy will be close to a randomized cumulative energy. The cumulative energy from the estimated variance in practice should lie between these two extremes. From FIG. 14, we see that the cumulative energy from the estimated variance in practice is close to the optimal cumulative energy. This suggests that the estimated variance is correlated with the residual pixel magnitude. This observation implies that the estimated variance is informative in predicting the magnitude of the residual signals on a pixel-by-pixel basis. In other words, the estimated variance from the prediction inaccuracy model can estimate the non-stationarity of the residual signal. In a practical video coding system, residual signals are usually encoded with transforms. The estimated variance function can be used to design more effective transforms for the residual blocks.

For some blocks, the estimated variance function may not be consistent with the magnitude of the residual signals. An inconsistent estimation of the residual magnitude will significantly degrade the performance. In the example system, we observe that replacing the DCT with the proposed KLT for every block only slightly improves the energy compaction performance on average. Replacing the ADST with the proposed KLT for every block slightly degrades the performance on average. In addition, the performance of using only the KLT varies significantly for different sequences. For a more robust performance, therefore, we use the example procedure in hybrid with other robust transforms.

3.3 Energy Compaction Performance

Figure 15:
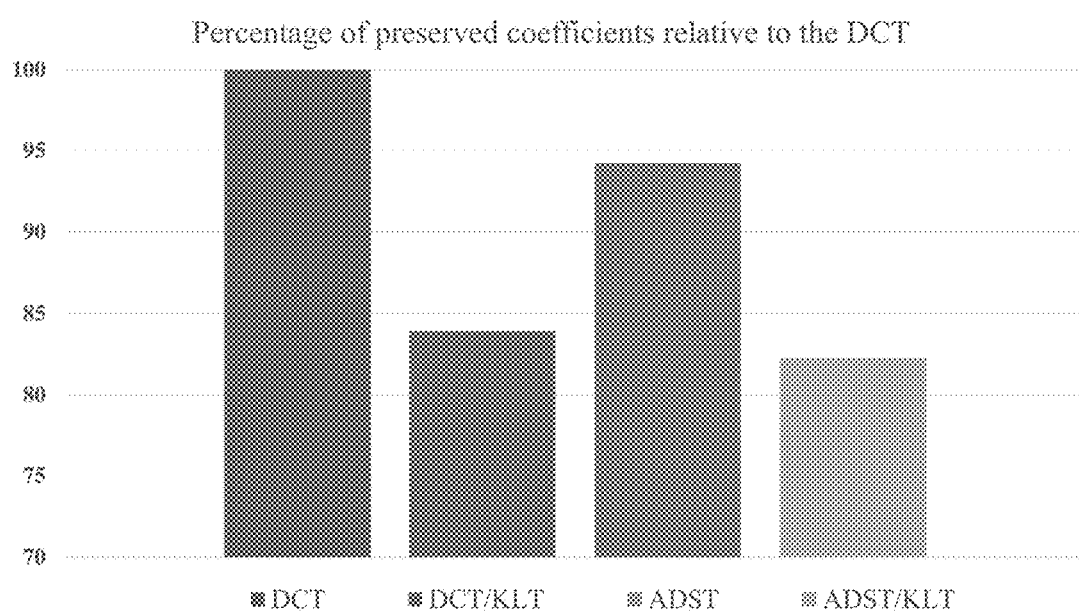
FIG. 15 is a bar chart of a comparison of preserved coefficients relative to the DCT.

The energy compaction performance of the of the example system is compared for the four transforms discussed in previous sections. They are 1) DCT, 2) ADST, 3) KLT hybrid with DCT and 4) KLT hybrid with DST. We measure the performance in terms of the percentage of coefficients used to preserve the same amount of energy relative to the DCT. The coefficient saving is measured when the same energy is preserved with 5% DCT coefficients, averaged over the sequences that we tested. The result is shown in FIG. 15.

From the figure, we see that the DCT on average results in the worst performance. Replacing the DCT with the ADST slightly improves the performance as expected. When the KLT is used in addition to either the DCT or the ADST, the performance significantly improves. This is because the prediction inaccuracy model is effective in many typical residual blocks. The covariance estimated from this model captures the non-stationarity of residual signals that neither the DCT nor the ADST can capture. In fact, when the KLT is used, whether it is hybrid with DCT or the ADST only makes a small difference. This implies that much non-stationarity in the residual signals is captured by the generated KLT. The remaining stationary blocks can be encoded with a reasonable stationary transform and the choice of such transform is not as important.

3.4 Example Practical Issues

The example procedure is currently evaluated by the energy compaction property. When the example procedure is implemented in a video coding system, some practical issues arise, which may be handled by appropriately configuring the system.

First, we note that in a video coding system with hybrid transforms, the system transmits 1-bit side information for each non-zero block, to indicate which transform to use. This small overhead is not likely to significantly affect the large positive gain from the better energy compaction.

Second, the entropy coding of the significant transform coefficients is ignored in the energy compaction analysis. A practical video coding system may scan the transform coefficients in a specific order and entropy code the transform coefficients. The order of scanning can be determined by the expected magnitude of transform coefficients. This information is available when computing the KLT basis functions from the covariance function.

Third, the covariance function is estimated from coded/decoded boundaries in a video coding system. The coded/decoded boundaries may be distorted due to quantization in the encoding procedure. This distortion may potentially affect the accuracy of the covariance estimation and hence the performance of the transform. To see the performance under the distorted estimation, the example comparisons described above can be repeated by estimating the covariance function from the distorted boundary information. Specifically, example system is configured to estimate the covariance function from boundaries of coded/decoded frames processed by a system configured according to the H.264 standard, under a reasonable range of QP. We did not observe a significant amount of performance degradation under such conditions.

The node 102 may be connected to or included within any of a variety of types of information sources. For example, the video or images may come from one or more sources such as a webcam, a video or still camera, a surveillance camera or a wireless handheld device such as a smartphone or a tablet. In some implementations, the source of information may be a file stored electronically in a server or any other computing device. In some implementations, the source of information may be a medical device that may transmit visual or other forms of data to a remote location. The source of information may also include, for example, any sensor, detector, recorder, or analyzer that can detect, derive, capture, store or record visual information such as video or images. In some implementations, the source of information may combine a plurality of sources including, but not limited to, the sources described above. The source of information may reside in any facility, location, or vehicle. For example, the source of information may be a security camera deployed in a building or campus. In another implementation, the source of information may be carried around by a user. In some implementations, the source of information may be an imager or detection devices on a satellite. In other implementations, the source of information may be deployed on a vehicle such as aircrafts, ships, or other manned or unmanned vehicles. The source of information may communicate with a node 102 that is connected to the network 104. In some implementations, the source of information may be a part of the node 102. In other implementations, the source of information may communicate with the node 102 via one or more networks and/or one or more intervening devices. Any hardware or software may be used to facilitate communication between the source of information and the node 102.

The node 102 may include devices capable of receiving and displaying or rendering images and/or video. For example, the node 102 could be a television or display device. The node 102 could be a desktop or laptop computer. The node could also be a wireless device such as a smartphone or a tablet that is capable of receiving, storing or displaying images and video. In some implementations, the node 102 could be a storage device such as a server or memory capable of storing the information. Such a server or memory may be optionally connected to a device capable of retrieving and displaying visual information.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 104 may comprise a wireless link, such as an infrared channel or satellite band. The topology of the network 104 may be a bus, star, or ring network topology. The network may include any number of repeaters, appliances, devices, servers, storage media and queues.

The compression techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program. The software may be provided on a computer-readable storage medium, such as a CD-ROM, readable by a general or special purpose programmable computer, or delivered over a communication medium such as network to a receiving device where it is stored in a computer-readable storage medium for execution. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software. Other implementations are within the scope of the following claims.

What is claimed is:

1. A method for encoding data, the method comprising:
  encoding a residual of a first portion of an array of data to generate a first set of coefficients;
  decoding the first set of coefficients to generate a decoded representation of the first portion;
  computing an estimated covariance function for a residual of a second portion of the array of data based on a model that includes a gradient of a plurality of boundary data values located on a boundary of the decoded representation of the first portion;
  computing a set of transform basis functions from the estimated covariance function; and
  encoding the residual of the second portion using a first transform that uses the computed set of transform basis functions, including generating a predicted representation of the second portion, and applying the first transform to a difference between the second portion and the predicted representation of the second portion.

2. The method of claim 1, wherein the second portion is adjacent to the first portion.

3. The method of claim 2, wherein encoding the residual of the second portion includes:
  generating the predicted representation of the second portion based at least in part on at least some of the plurality of boundary data values.

4. The method of claim 3, wherein generating the predicted representation includes copying at least some of the plurality of boundary data values along a prediction direction.

5. The method of claim 4, wherein the model is based on inaccuracy in the prediction direction.

6. The method of claim 5, wherein the model relates statistics of intensities of the residual of the second portion to the gradient of the plurality of boundary data values and to the inaccuracy in the prediction direction.

7. The method of claim 1, wherein computing the estimated covariance function includes computing an estimated variance function at each of multiple locations of data values in the second portion, and computing the estimated covariance function based on the estimated variance function.

8. The method of claim 1, wherein the gradient of the plurality of boundary data values of the decoded representation of the first portion is computed based on at least a first difference between a first pair of boundary data values.

9. The method of claim 8, wherein the gradient of the plurality of boundary data values of the decoded representation of the first portion is computed based on multiple differences between respective pairs of boundary data values, including the first difference and a second difference between a second pair of boundary data values, where at least one boundary data value in the second pair is at a different location on the boundary than any data value in the first pair.

10. The method of claim 1, wherein encoding the residual of the first portion includes using a second transform different from the first transform, and decoding the first set of coefficients includes using an inverse of the second transform.

11. The method of claim 1, further comprising: selecting the first transform after comparing a measure of encoding performance for the first transform with a measure of encoding performance for a second transform that does not use the computed set of transform basis functions.

12. The method of claim 1, wherein the set of transform basis functions comprise Karhunen-Loève transform basis functions.

13. A non-transitory computer-readable medium storing a computer program for encoding data, the computer program comprising instructions for causing a computer system to:
  encode a residual of a first portion of an array of data to generate a first set of coefficients;
  decode the first set of coefficients to generate a decoded representation of the first portion;
  compute an estimated covariance function for a residual of a second portion of the array of data based on a model that includes a gradient of a plurality of boundary data values located on a boundary of the decoded representation of the first portion;
  compute a set of transform basis functions from the estimated covariance function; and
  encode the residual of the second portion using a first transform that uses the computed set of transform basis functions, including generating a predicted representation of the second portion, and applying the first transform to a difference between the second portion and the predicted representation of the second portion.

14. An apparatus for encoding data, the apparatus comprising:
  transmitter circuitry configured to transmit encoded data representing portions of an array of data, and
  at least one processor in communication with the transmitter circuitry, configured to:
    encode a residual of a first portion of the array of data to generate a first set of coefficients;
    decode the first set of coefficients to generate a decoded representation of the first portion;
    compute an estimated covariance function for a residual of a second portion of the array of data based on a model that includes a gradient of a plurality of boundary data values located on a boundary of the decoded representation of the first portion;
    compute a set of transform basis functions from the estimated covariance function; and
    encode the residual of the second portion using a first transform that uses the computed set of transform basis functions, including generating a predicted representation of the second portion, and applying the first transform to a difference between the second portion and the predicted representation of the second portion.

15. A method for decoding data, the method comprising:
  receiving data including coefficients representing portions of an array of data;
  decoding a first set of coefficients to generate a decoded representation of a first portion of the array of data;
  computing an estimated covariance function for a residual of a second portion of the array of data based on a model that includes a gradient of a plurality of boundary data values located on a boundary of the decoded representation of the first portion;
  computing a set of transform basis functions from the estimated covariance function; and generating a decoded representation of the second portion using an inverse of a first transform that uses the computed set of transform basis functions, including generating a predicted representation of the second portion, and applying the inverse of the first transform to a second set of coefficients to generate a residual of the second portion.

16. The method of claim 15, wherein the second portion is adjacent to the first portion.

17. The method of claim 16, wherein generating the decoded representation of the second portion includes:
generating the predicted representation of the second portion based at least in part on at least some of the plurality of boundary data values; and
computing the decoded representation of the second portion based on a sum of the predicted representation and the residual of the second portion.

18. The method of claim 17, wherein generating the predicted representation includes copying at least some of the plurality of boundary data values along a prediction direction.

19. The method of claim 18, wherein the model is based on inaccuracy in the prediction direction.

20. The method of claim 19, wherein the model relates statistics of intensities of the residual of the second portion to the gradient of the plurality of boundary data values and to the inaccuracy in the prediction direction.

21. The method of claim 15, wherein computing the estimated covariance function includes computing an estimated variance function at each of multiple locations of data values in the second portion, and computing the estimated covariance function based on the estimated variance function.

22. The method of claim 15, wherein the gradient of the plurality of boundary data values of the decoded representation of the first portion is computed based on at least a first difference between a first pair of boundary data values.

23. The method of claim 22, wherein the gradient of the plurality of boundary data values of the decoded representation of the first portion is computed based on multiple differences between respective pairs of boundary data values, including the first difference and a second difference between a second pair of boundary data values, where at least one boundary data value in the second pair is at a different location on the boundary than any data value in the first pair.

24. The method of claim 15, wherein decoding the first set of coefficients to generate the decoded representation of the first portion includes using an inverse of a second transform different from the first transform.

25. The method of claim 15, further comprising: selecting the first transform based on information received from an encoder that compared a measure of encoding performance for the first transform with a measure of encoding performance for a second transform that does not use the computed set of transform basis functions.

26. The method of claim 15, wherein the set of transform basis functions comprise Karhunen-Loève transform basis functions.

27. A non-transitory computer-readable medium storing a computer program for decoding data, the computer program comprising instructions for causing a computer system to:
receive data including coefficients representing portions of an array of data;
decode a first set of coefficients to generate a decoded representation of a first portion of the array of data;
compute an estimated covariance function for a residual of a second portion of the array of data based on a model that includes a gradient of a plurality of boundary data values located on a boundary of the decoded representation of the first portion;
compute a set of transform basis functions from the estimated covariance function; and
generate a decoded representation of the second portion using an inverse of a first transform that uses the computed set of transform basis functions, including generating a predicted representation of the second portion, and applying the inverse of the first transform to a second set of coefficients to generate a residual of the second portion.

28. An apparatus for decoding data, the apparatus comprising:
receiver circuitry configured to receive data including coefficients representing portions of an array of data, and
at least one processor in communication with the receiver circuitry, configured to:
decode a first set of coefficients to generate a decoded representation of a first portion of the array of data;
compute an estimated covariance function for a residual of a second portion of the array of data based on a model that includes a gradient of a plurality of boundary data values located on a boundary of the decoded representation of the first portion;
compute a set of transform basis functions from the estimated covariance function; and
generate a decoded representation of the second portion using an inverse of a first transform that uses the computed set of transform basis functions, including generating a predicted representation of the second portion, and applying the inverse of the first transform to a second set of coefficients to generate a residual of the second portion.

* * * * *